US012747680B2

(12) United States Patent
Chennoju et al.

(10) Patent No.: US 12,747,680 B2
(45) Date of Patent: Sep. 29, 2026

(54) APPARATUS AND METHOD OF PURGING GAS TURBINE EXHAUST TROUGH TO REDUCE HOT FLOW LEAKAGE

(71) Applicant: GE Vernova Infrastructure Technology LLC, Greenville, SC (US)

(72) Inventors: Veerraju Chennoju, Karnataka (IN); Debabrata Mukhopadhyay, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 19/139,104

(22) PCT Filed: Dec. 8, 2023

(86) PCT No.: PCT/US2023/083159
§ 371 (c)(1),
(2) Date: Jun. 13, 2025

(87) PCT Pub. No.: WO2024/137224
PCT Pub. Date: Jun. 27, 2024

(65) Prior Publication Data

US 2026/0210274 A1 Jul. 23, 2026

(30) Foreign Application Priority Data

Dec. 20, 2022 (IN) ............................ 202211073999

(51) Int. Cl.
*F01D 25/30* (2006.01)
*F01D 11/00* (2006.01)

(52) U.S. Cl.
CPC .............. *F01D 25/30* (2013.01); *F01D 11/00* (2013.01); *F05D 2240/55* (2013.01)

(58) Field of Classification Search
CPC ....... F01D 25/30; F01D 11/00; F05D 2240/55
See application file for complete search history.

(56) References Cited

U.S. PATENT DOCUMENTS

| | | | | |
|---|---|---|---|---|
| 6,065,756 | A | 5/2000 | Eignor et al. | |
| 7,793,507 | B2 | 9/2010 | Poccia et al. | |
| 8,661,828 | B2 * | 3/2014 | Pieussergues | F02C 7/28 60/753 |
| 9,903,216 | B2 * | 2/2018 | Chuong | F01D 25/24 |
| 10,830,103 | B2 | 11/2020 | Mohammed et al. | |
| 2011/0179798 | A1 | 7/2011 | Pieussergues et al. | |
| 2015/0330241 | A1 | 11/2015 | Chuong et al. | |

FOREIGN PATENT DOCUMENTS

| | | |
|---|---|---|
| CN | 104769235 A | 7/2015 |
| JP | 2017096275 A | 6/2017 |

* cited by examiner

*Primary Examiner* — Michael L Sehn
(74) *Attorney, Agent, or Firm* — Charlotte Wilson; James Pemrick; Hoffman Warnick LLC

(57) ABSTRACT

A purge box, which is added to an expansion joint between an exhaust diffuser and an aft diffuser, can include a cover plate and a T-fairing radially adjacent the cover plate. An inner fairing of T-fairing can be an extension of a duct of the exhaust diffuser and can be attached to a flex seal of the joint. A leg of the T-fairing extends radially outward toward a cover projection extending from a rear of the cover plate. A purge box flow path can have at least one seal therein to reduce flow while accommodating radial and/or axial movement of the duct, the cover plate, and/or the T-fairing to improve operational efficiency of the turbine and safety of those nearby.

20 Claims, 8 Drawing Sheets

APPARATUS AND METHOD OF PURGING GAS TURBINE EXHAUST TROUGH TO REDUCE HOT FLOW LEAKAGE

CROSS-REFERENCE TO RELATED APPLICATIONS

This application is a U.S. national stage filing under 35 U.S.C. § 371 of International Patent Application No. PCT/US2023/083159, filed Dec. 8, 2023, which international application claims the benefit of and priority to Indian Application No. 202211073999, filed Dec. 20, 2022, the entire contents of these applications are incorporated herein by reference.

TECHNICAL FIELD

The disclosure relates generally to gas turbine exhaust system management. More specifically, the disclosure is directed to an apparatus and method of purging a gas turbine exhaust drain trough to reduce hot flow leakage.

BACKGROUND

Turbomachines can experience a reduction in working efficiency due to pressure loss at various locations in the system, particularly at joints of components forming a flow path through the turbomachine. For example, a turbomachine with a hot gas path that includes an exhaust diffuser feeding into a transition diffuser duct or an aft diffuser via a drain trough may experience pressure loss as exhaust gas passes through seals at the joints, particularly at the expansion joint that includes the drain trough. In addition, hot gas path components of gas turbines and aviation engines, particularly turbine blades, vanes, nozzles, seals, and stationary shrouds, operate at elevated temperatures, often in excess of 650° Celsius (C). Hot exhaust gases leaking through seals at the expansion joint can thus damage external equipment and pose a danger to personnel in the vicinity. It is believed that, due to the potential efficiency reduction and risk of injury, reduction of hot flow path leakage may be desirable, such as by using an improved seal arrangement and/or by pressurizing a purge cavity adjacent to the expansion joint to prevent or reduce leakage of exhaust gases from the expansion joint.

BRIEF DESCRIPTION

All aspects, examples and features mentioned below can be combined in any technically possible way.

An aspect of the disclosure provides a purge box for a turbomachine including an exhaust diffuser, an aft diffuser, and an expansion joint including a drain trough therebetween, the purge box including: a cover plate attached to a housing of the turbomachine, a portion of the housing acting as a wall of the purge box; a flex seal of the expansion joint, the flex seal acting as a rear cover of the purge box; an inner fairing adjacent an inner periphery of the cover plate with a gap between the inner periphery of the cover plate and the inner fairing; a purge box flow path from an interior of the purge box to the gap, the gap being adjacent the exhaust diffuser; at least one seal in the purge box flow path; and an inlet through the cover plate and in fluid communication with a source of purging fluid having a pressure selected to induce a pressure in the purge box that is higher than a pressure within the drain trough.

Another aspect of the disclosure includes any of the preceding aspects, and the inner fairing is part of a T-fairing that includes a leg extending radially outward from the inner fairing adjacent the cover plate and that forms a part of the purge box flow path.

Another aspect of the disclosure includes any of the preceding aspects, and a cover projection extends from a rear of the cover plate parallel to a rotational axis of the turbomachine and forms a part of the purge box flow path.

Another aspect of the disclosure includes any of the preceding aspects, and the at least one seal includes a seal configured to reduce flow through the purge box flow path while accommodating movement between the exhaust diffuser and the aft diffuser in a direction parallel to a rotational axis of the turbomachine.

Another aspect of the disclosure includes any of the preceding aspects, and the at least one seal includes a seal configured to reduce flow through the purge box flow path while accommodating movement between the exhaust diffuser and the aft diffuser in a radial direction of the turbomachine.

Another aspect of the disclosure includes any of the preceding aspects, and the at least one seal includes a first seal engaging a wall of the purge box flow path that is parallel to a rotational axis of the turbomachine, the first seal being connected to a part of the inner fairing so that the first seal can accommodate motion between the exhaust diffuser and the aft diffuser in a direction parallel to the rotational axis of the turbomachine.

Another aspect of the disclosure includes any of the preceding aspects, and the at least one seal further includes a second seal engaging a wall of the purge box flow path that extends in a radial direction of the turbomachine, the second seal being attached to a part of the inner fairing so that the second seal can accommodate motion between the exhaust diffuser and the aft diffuser in a radial direction of the turbomachine.

Another aspect of the disclosure includes any of the preceding aspects, and the pressure of the purging fluid is at least 110,000 Pascals (Pa).

Another aspect of the disclosure includes any of the preceding aspects, and the pressure in the purge box is at least 20 Pa higher than the pressure within the drain trough.

An aspect of the disclosure provides an apparatus for a turbomachine exhaust system, the exhaust system comprising an exhaust diffuser, an aft diffuser, and an expansion joint including a drain trough therebetween, the apparatus comprising a cover plate extending radially from a housing of the turbomachine; a T-fairing including an inner fairing adjacent an inner periphery of the cover plate with a gap therebetween, the inner fairing extending substantially parallel to a rotational axis of the turbomachine, the T-fairing further including a leg extending radially outward from the inner fairing adjacent and rearward of the cover plate; a rear cover connected to the inner fairing and the housing of the turbomachine; a purge box including at least the cover plate, the T-fairing, the rear cover, and the housing of the turbomachine, the T-fairing defining with the inner fairing and the cover plate a purge box flow path from an interior of the purge box, between the cover plate and the leg, and through the gap between the inner periphery of the cover plate and the inner fairing; at least one seal in the purge box flow path; and a purge inlet extending through the cover plate and connected to a source of purging fluid at a pressure selected to induce a pressure in the purge box that is higher than an operational pressure within the drain trough.

Another aspect of the disclosure includes any of the preceding aspects, further comprising a cover projection extending parallel to the rotational axis of the turbomachine from a rear of the cover plate, the cover projection being radially outward of and radially adjacent the leg of the T-fairing, the purge box flow path further including a portion between and defined by the leg and the cover projection, and the at least one seal includes a first seal between the leg of the T-fairing and the cover projection.

Another aspect of the disclosure includes any of the preceding aspects, and the first seal includes a first tadpole seal having a head between the leg of the T-fairing and the cover projection and a tail extending from the head radially inward along and connected to the leg of the T-fairing.

Another aspect of the disclosure includes any of the preceding aspects, and the at least one seal further includes a second seal between the cover plate and the first seal.

Another aspect of the disclosure includes any of the preceding aspects, and the second seal includes a second tadpole seal having a respective head between the cover plate, the cover projection, and the leg of the T-fairing, a respective tail of the second tadpole seal extending from the head and connected to the leg of the T-fairing.

Another aspect of the disclosure includes any of the preceding aspects, and the tail of the second tadpole seal extends around an outer periphery of the leg of the T-fairing and radially inward along the leg of the T-fairing.

Another aspect of the disclosure includes any of the preceding aspects, and the second seal includes a rope seal on the cover projection and the at least one seal further includes a W seal engaging the rope seal and connected to the leg of the T-fairing.

Another aspect of the disclosure includes any of the preceding aspects, and the at least one seal further includes a forward seal between an inner periphery of the cover plate and the inner fairing, the forward seal being positioned to at least partially block the gap.

Another aspect of the disclosure includes any of the preceding aspects, and the forward seal is a tadpole seal with a head engaging the inner fairing and a tail connected to the cover plate.

Another aspect of the disclosure includes any of the preceding aspects, and a temperature of the purging fluid is no more than 40° C.

Another aspect of the disclosure includes any of the preceding aspects, and the pressure in the purge box is at least 20 Pa higher than the pressure within the drain trough.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
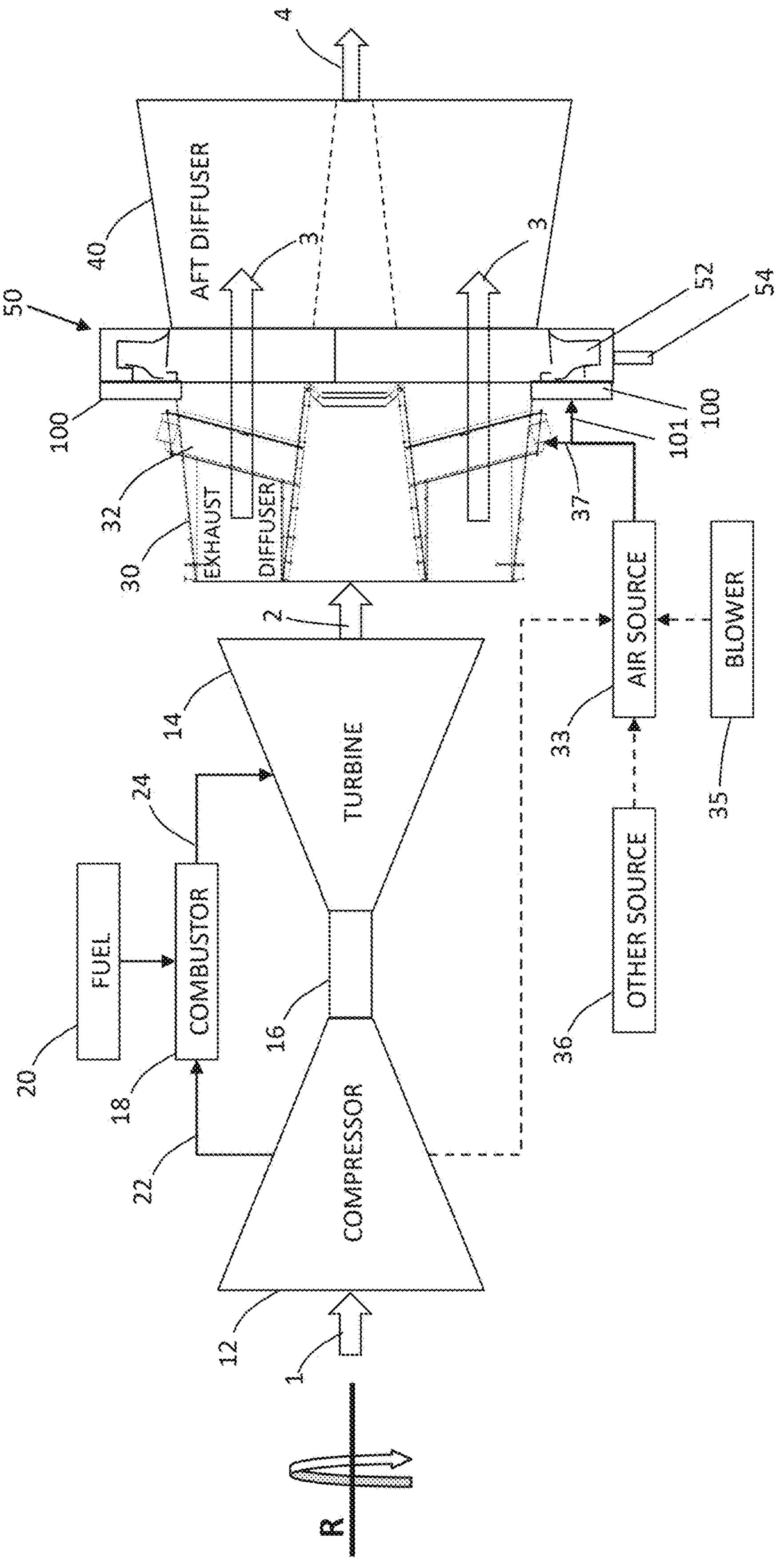
FIG. 1 is a schematic view of an example turbomachine in which aspects of embodiments disclosed herein may be deployed.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant compositions for machine components within turbomachinery. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms “first,” “second,” and “third” may be used interchangeably to distinguish one component from another and are not intended to signify location or importance of the individual components.

The terminology used herein is for the purpose of describing particular embodiments only and is not intended to be limiting of the disclosure. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components but do not preclude the presence or addition of one or more other features, integers, steps, operations, elements, components, and/or groups thereof. “Optional” or “optionally” means that the subsequently described event or circumstance may or may not occur or that the subsequently described component or element may or may not be present, and that the description includes instances where the event occurs, or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 2:
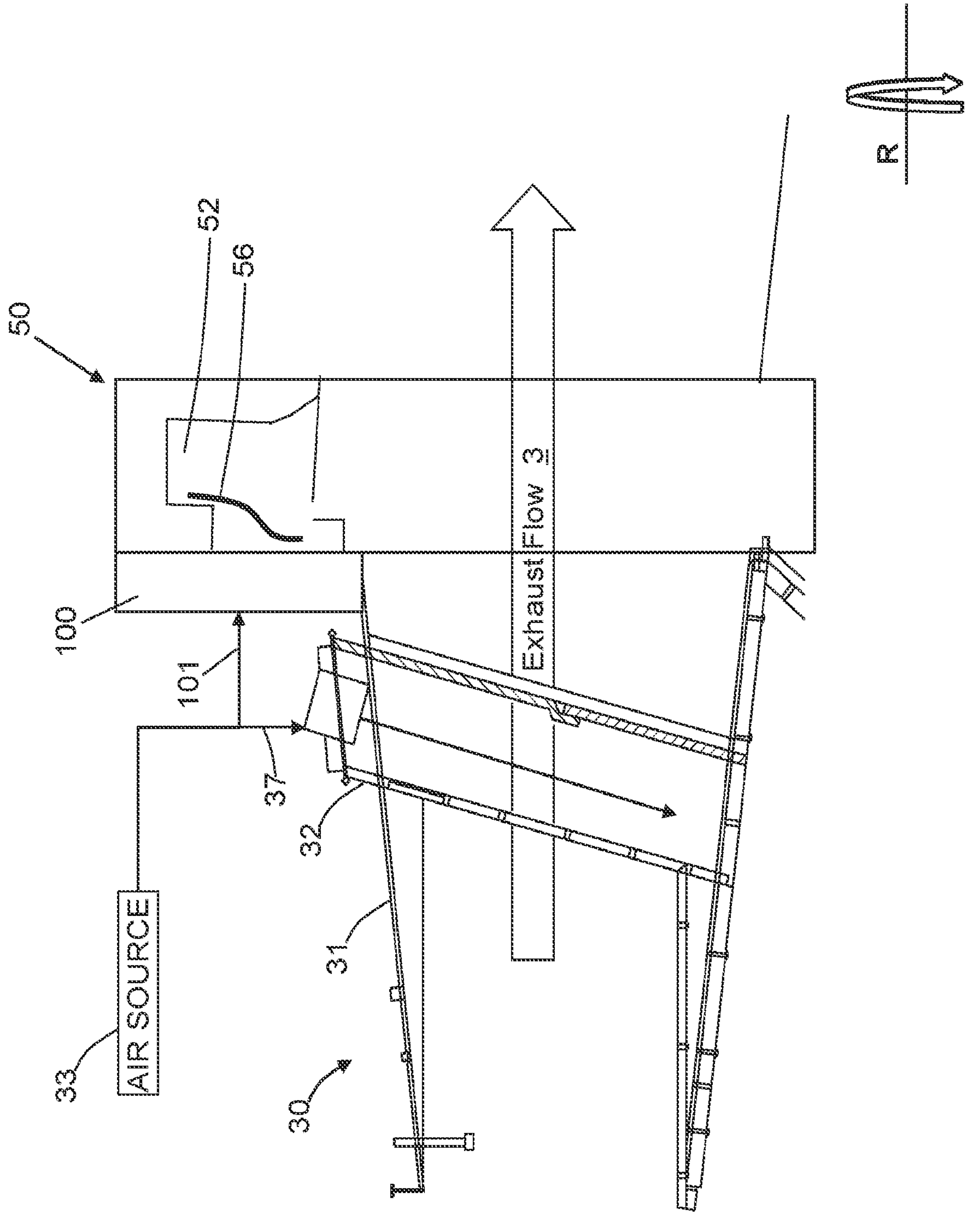
FIG. 2 is an enlarged schematic cross-sectional view of a joint between an exhaust diffuser of a turbomachine and an aft diffuser of a turbomachine in which a purge box according to embodiments of the disclosure has been deployed.

With reference to FIGS. 1 and 2, embodiments disclosed herein can be implemented in a turbomachine 10 including a compressor 12 and a turbine 14 connected by a shaft 16. Compressor 12 receives intake air 1 to produce compressed air 22. Turbine 14 drives compressor 12 in response to a combustor 18 burning fuel 20 mixed with compressed air 22 to produce hot exhaust gas 24 that impinges on blades (not shown) of turbine 14, thereby driving turbine 14. After passing through turbine 14, exhaust gas 2 continues into an exhaust diffuser 30, which can include manways 32 through which cooling air 37 from an air source 33 can be passed to cool and purge exhaust diffuser 30. Cooling air 37 can then pass through an aft diffuser 40, which can be connected to exhaust diffuser 30 by an expansion joint 50. To drain out unwanted oils and other foreign material, such as during water wash, a trough 52 can be provided in expansion joint 50 between exhaust diffuser 30 and aft diffuser 40. In the example shown, trough 52 can include, such as in a bottom portion, a drain 54 through which liquids, such as post-water wash liquids and the like, can collect and be removed.

In embodiments, a purge box 100 can be added to the upstream side of expansion joint 50 to reduce or prevent leakage of exhaust gases from the trough 52 and can receive purging fluid 101, such as air, from air source 33 for this purpose. As seen in FIG. 2, expansion joint 50 can include a seal 56, such as a flex seal. Examples of expansion joints and flex seal arrangements usable in the embodiments described herein include those shown in U.S. Pat. Nos. 6,065,756; 7,793,507; and 10,830,103, the disclosures of which are incorporated by reference. The flex seal 56 may include a plurality of seal layers and circumferential seal segments, which are arranged in overlapping fashion to create a tortuous leakage path for the exhaust gases. While the schematic illustrations of FIGS. 1 and 2 show purge box 100 as outside of and directly adjacent to expansion joint 50, it should be understood that all or part of purge box 100 can be within the illustrated boundaries of expansion joint 50 in various embodiments.

Figure 3:
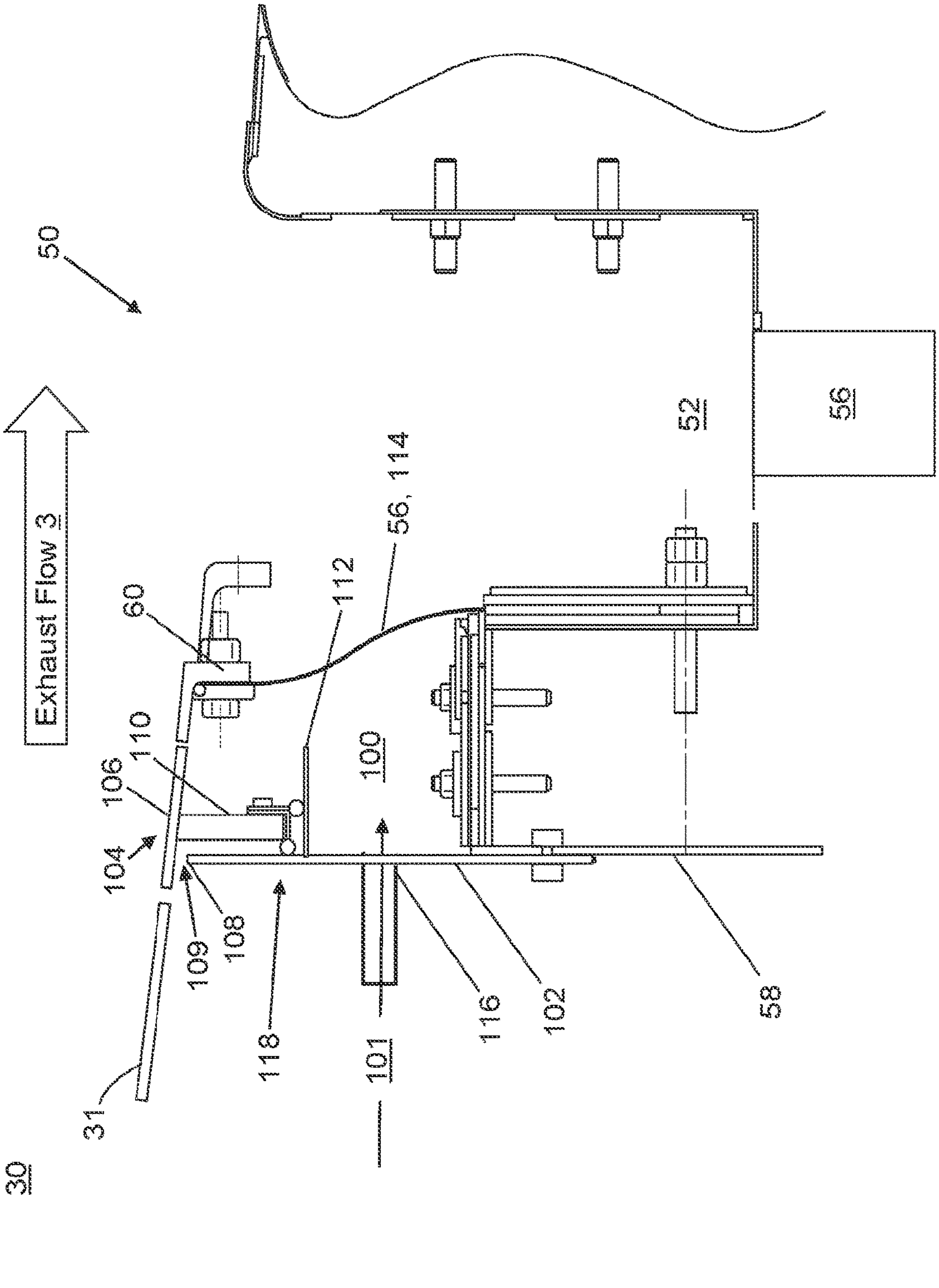
FIG. 3 is an enlarged view of a lower portion of a joint between an exhaust diffuser of a turbomachine and an aft diffuser of a turbomachine, illustrating a drain trough with which aspects of embodiments disclosed herein may be deployed.
Figure 4:
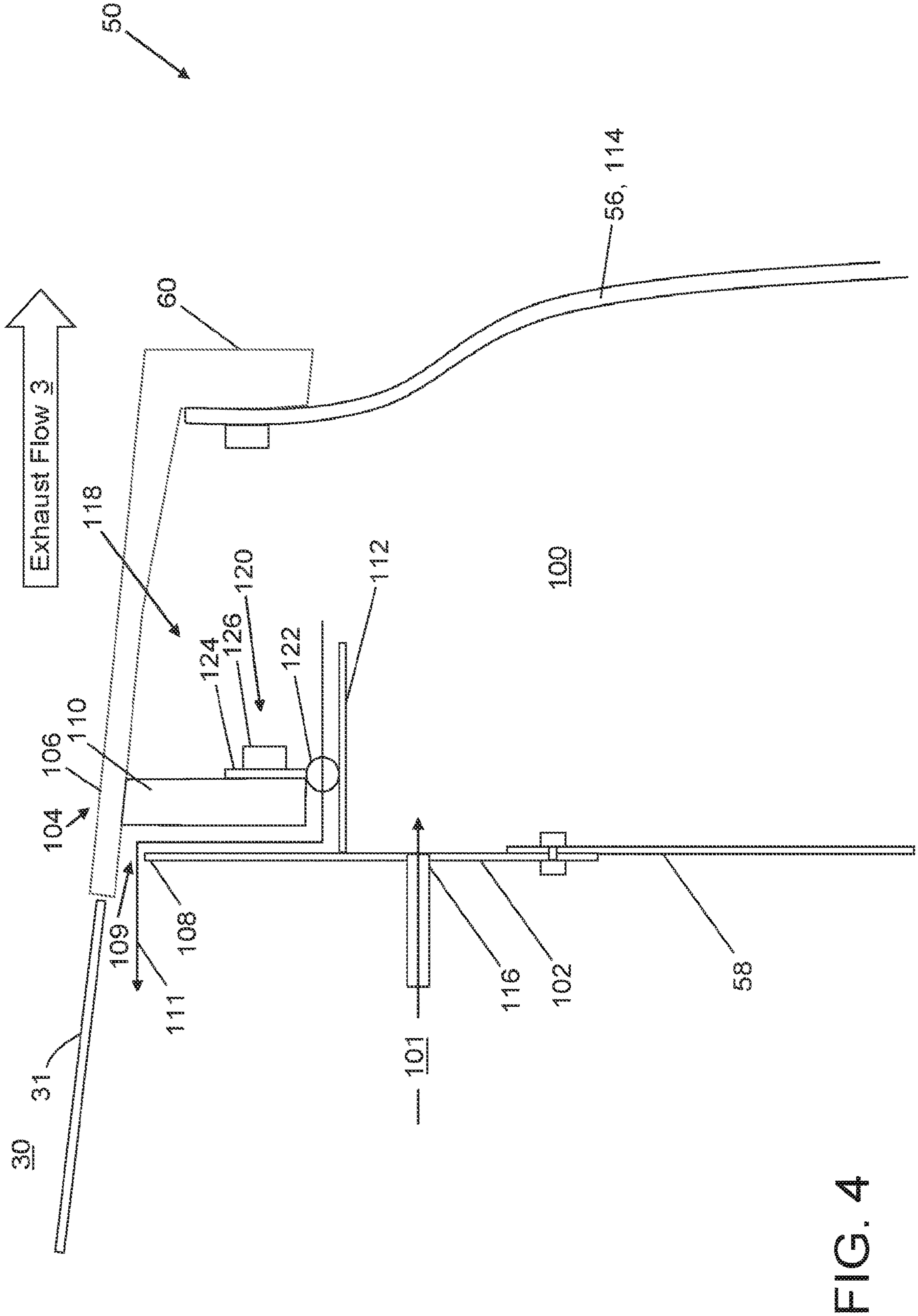
FIG. 4 is an enlarged view of a portion of a purge box, according to embodiments disclosed herein.

Turning now to FIGS. 3 and 4, which depict the bottom of the expansion joint 50, aspects of embodiments described herein include an apparatus and method for reducing hot flow leakage from an exhaust system of turbomachine 10. Embodiments include purge box 100 including a cover plate 102 that extends radially from a housing 58 of turbomachine 10, such as at an upstream end of expansion joint 50. Purge box 100 can further include a T-fairing 104 including an inner fairing 106 adjacent an inner periphery 108 of cover plate 102 with a gap 109 therebetween. Gap 109 is necessary to accommodate thermal expansion of the housing 58 during operation of the turbomachine 10.

In embodiments, inner fairing 106 can extend substantially parallel to a rotational axis R of turbomachine 10. T-fairing 104 can further include a leg 110 extending radially outwardly from inner fairing 106 adjacent to and rearward of cover plate 102. A cover projection 112, such as a horizontal plate, can extend parallel to rotational axis R (FIGS. 1 and 2) of turbomachine 10 from a rear side of cover plate 102, cover projection 112 being radially outward of and radially adjacent leg 110 of T-fairing 104. A purge box flow path 111 (FIG. 4) can thereby be established from an interior of purge box 100, between leg 110 and cover projection 112, between leg 110 and cover plate 102, and through gap 109 between inner periphery 108 of cover plate 102 and inner fairing 106. One object of the present disclosure is to reduce or prevent the flow of high-temperature exhaust gases through the purge box flow path 111 and to reduce the temperature of such exhaust gases to reduce the likelihood of damage to neighboring equipment and to ensure safety of personnel operating in the vicinity of the exhaust diffuser 30 and expansion joint 50.

A rear cover 114 can be connected to inner fairing 106 and housing 58 of turbomachine 19. Purge box 100 can thereby be formed by at least cover plate 102, T-fairing 104, rear cover 114, and housing 58 of turbomachine 10. In embodiments, rear cover 114 can include or be formed by flex seal 56, though other suitable arrangements could be used. It should be noted that while T-fairing 104 is shown as a separate part in some illustrations and interposed between an upstream end of expansion joint 50 and a radial flange 60 to which rear cover 114/flex seal 56 is attached, in other embodiments, T-fairing 104 can include radial flange 60 and/or can be an extension of a duct 31 of exhaust diffuser 30.

As illustrated in more detail in FIG. 4, at least one seal 118 can be included in purge box flow path 111 to reduce flow from escaping purge box 100 during operation of turbomachine 10. A purge inlet 116 can extend through cover plate 102 and can be connected to a source 33, 35 or 36 (FIG. 1) of purging fluid 101. The purging fluid 101 can include a gas at a pressure higher than an operational pressure of expansion joint 50. As illustrated in FIG. 1, purging fluid 101 can be air, such as from compressor 12, blower 35, or some other source 36. In embodiments, it can be advantageous to use the same source that is used to provide cooling fluid 37 for diffuser strut 32, though other arrangements can be employed.

With additional reference to FIGS. 4-8, the at least one seal 118 in embodiments can include a first seal 120 between leg 110 of T-fairing 104 and cover projection 112. For example, as illustrated in FIG. 4, first seal 120 can take the form of a "tadpole" seal including a head 122 between leg 110 of T-fairing 104 and cover projection 112 and a tail 124 extending from head 122 radially inward along and connected to leg 110 of T-fairing 104, such as by a bolt or the like 126. First seal 120 so situated in purge box flow path 111 can reduce flow therethrough while accommodating movement of exhaust diffuser 30 and cover projection 112 parallel to rotational axis R of turbomachine 10.

Figure 5:
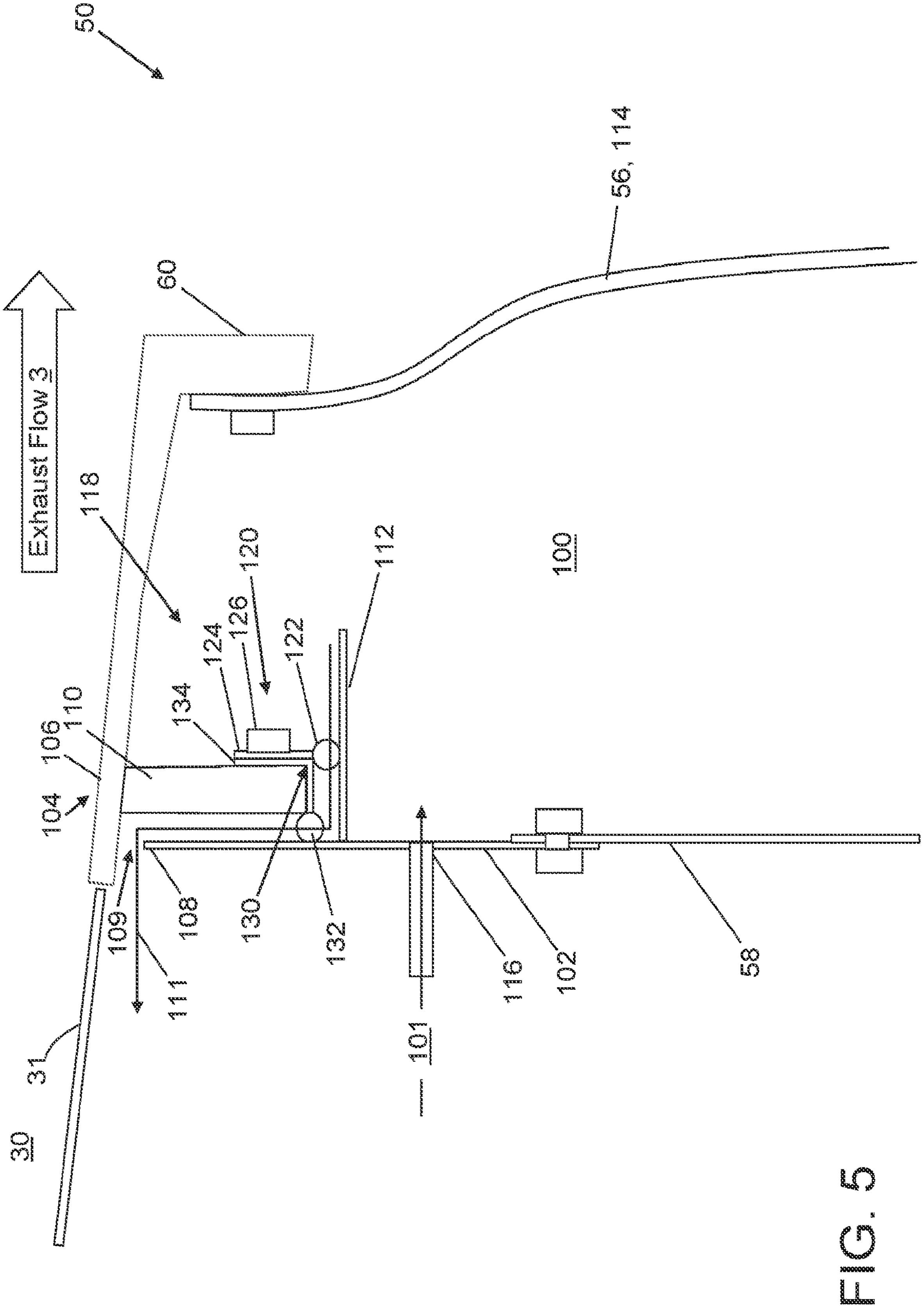
FIG. 5 is an enlarged view of a portion of a purge box, according to embodiments disclosed herein.

The at least one seal 118 in embodiments, as seen in FIG. 5, can further include a second seal 130 between cover plate 102 and first seal 120, such as between cover plate 102 and leg 110 of T-fairing 104. Second seal 130 can include, for example, a second tadpole seal having a respective head 132 proximate to or contacting cover plate 102 and between cover projection 112 and leg 110 of T-fairing 104, and a respective tail 134 of second seal 130 extending from head 132 and being connected to leg 110 of T-fairing 104. For example, tail 134 of the second tadpole seal can extend around an outer periphery of leg 110 of T-fairing 104 and radially inward along leg 110 of T-fairing 104, which can allow tail 134 of second seal 130 to be attached to leg 110 along with tail 124 of first seal 120 by bolt 126. In other embodiments, a second bolt (not shown) could be used to connect tail 134 of second seal 130 instead of or in addition to bolt 126.

Figure 6:
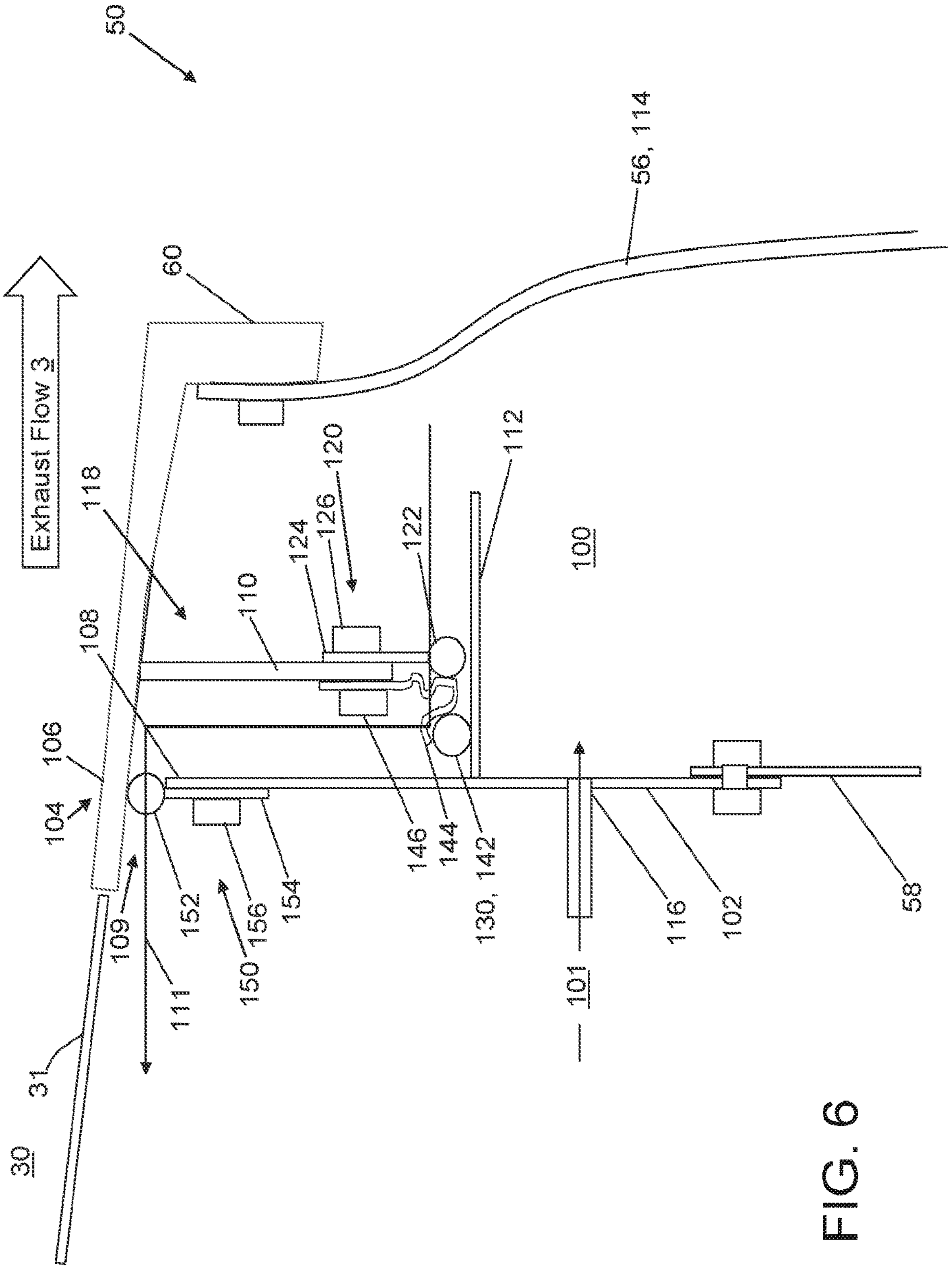
FIG. 6 is an enlarged view of a portion of a purge box, according to embodiments disclosed herein.

In other embodiments, as shown in FIG. 6, second seal 130 can include a rope seal 142 on cover projection 112, and the at least one seal 118 can further include a W seal 144 engaging rope seal 142 and connected to leg 110 of T-fairing 104, such as by a bolt 146. In such embodiments, W seal 144 can provide a biasing force on rope seal 142 toward cover projection 112 to assist in retaining a position of rope seal 142 thereon. So situated, rope seal 142 can further reduce flow through purge box flow path 111 while also accommodating movement of cover projection 112 parallel to rotational axis R of turbomachine 10.

Figure 7:
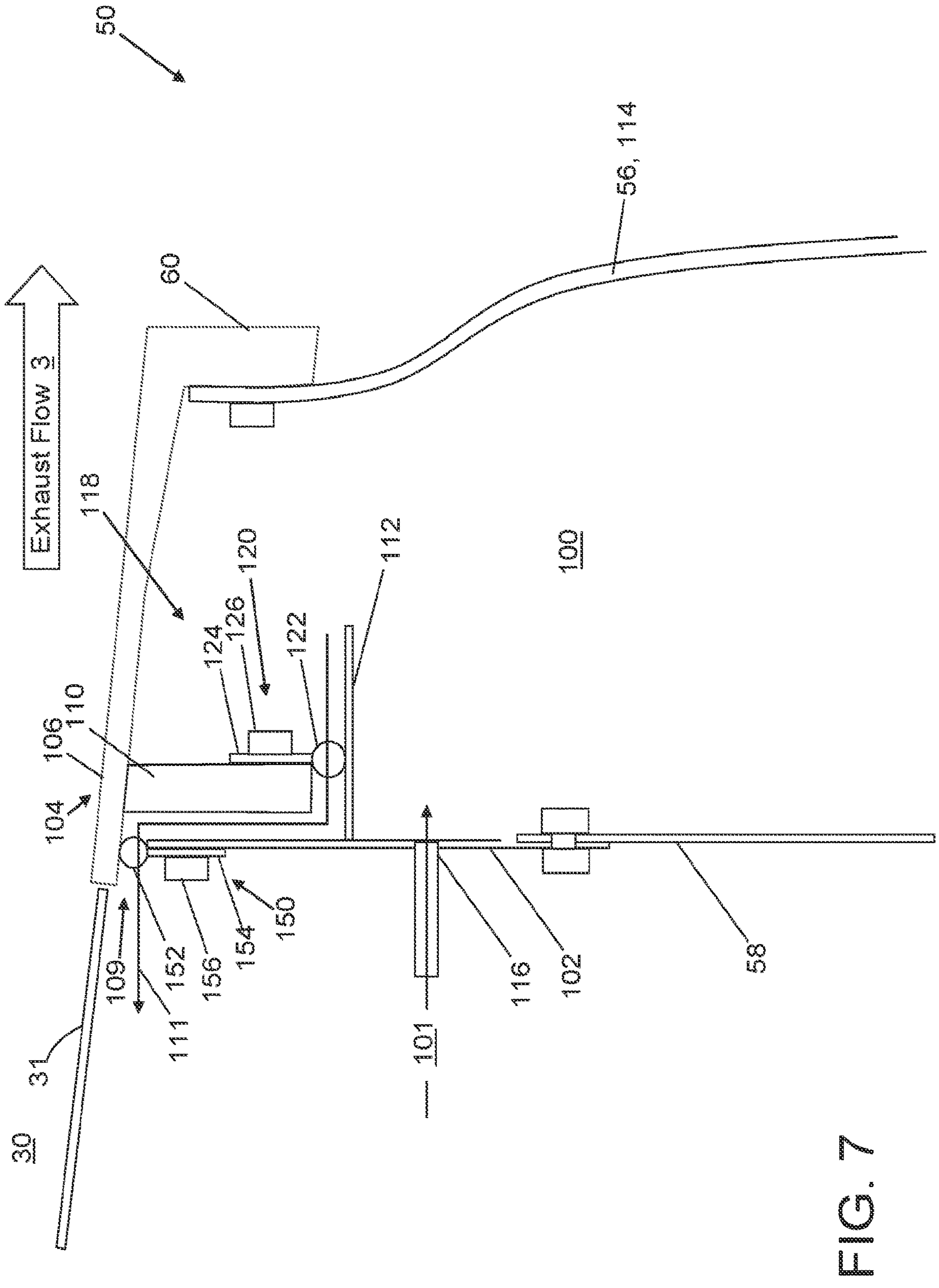
FIG. 7 is an enlarged view of a portion of a purge box, according to embodiments disclosed herein.
Figure 8:
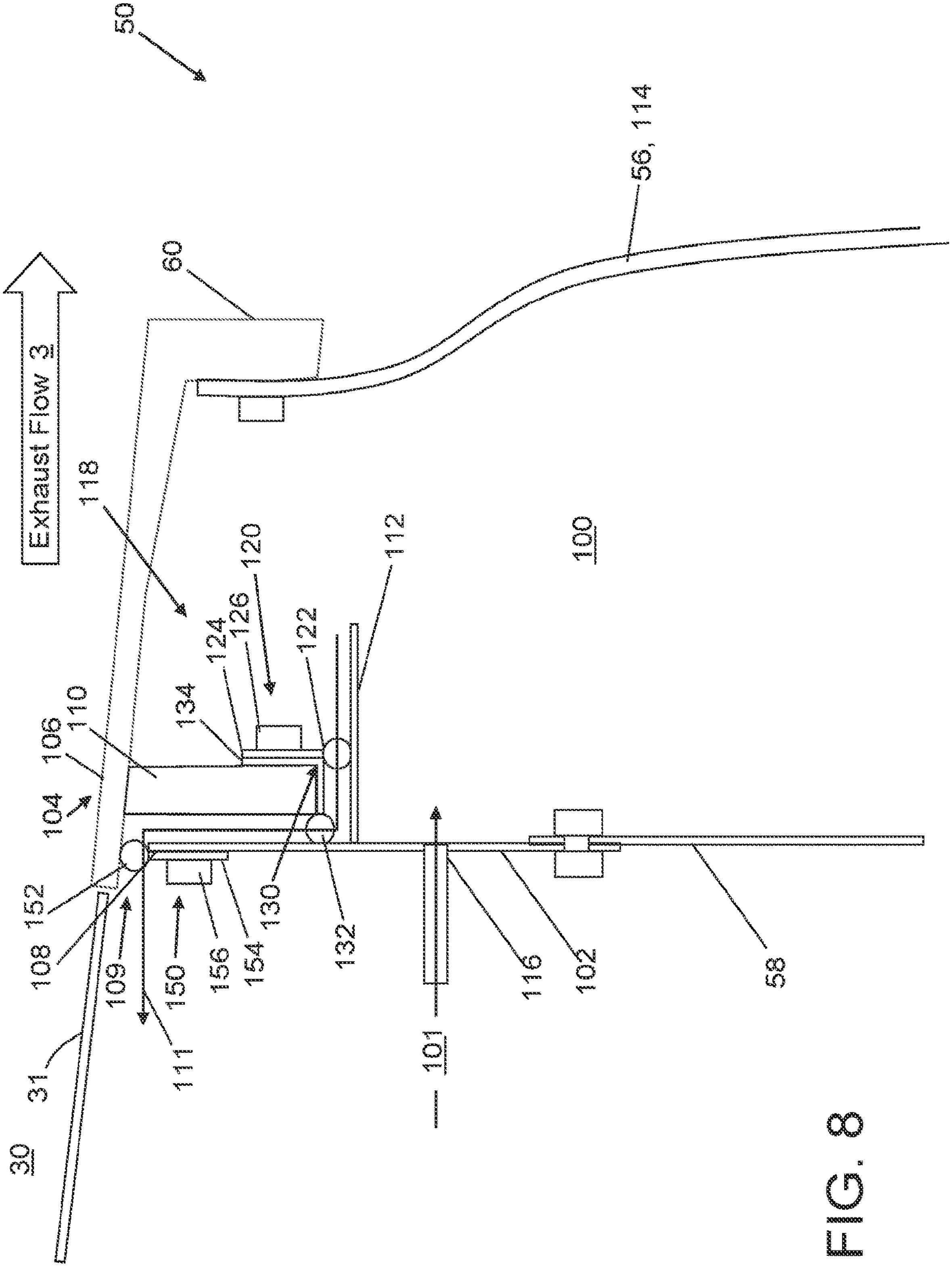
FIG. 8 is an enlarged view of a portion of a purge box, according to embodiments disclosed herein.

To even further reduce flow through purge box flow path 111, in embodiments as shown in FIG. 6, the at least one seal 118 can further include a forward seal 150 between inner periphery 108 of cover plate 102 and inner fairing 106, blocking gap 109. Forward seal 150, for example, can include a tadpole seal with a head 152 engaging inner fairing 106 and a tail 154 connected to cover plate 102. For example, tail 154 can extend radially inward from head 152 along cover plate 102 and be connected thereto by a bolt 156. So situated, forward seal 150 can reduce flow through purge box flow path 111 by blocking gap 109 while accommodating radial movement between inner fairing 106 and cover plate 102. Forward seal 150 can also be used in combination with other examples of the at least one seal 118 as illustrated in FIGS. 7 and 8. In FIG. 7, for example, forward seal 150 is used in conjunction with first seal 120, and in FIG. 8, forward seal 150 is used in conjunction with first seal 120 and second seal 130. Forward seal 150 may also be used with the seal embodiments shown in FIGS. 4 and 5 to block gap 109.

As indicated above, embodiments include a source 33 (FIG. 1) of purging fluid 101 that can include at least one of blower 35, compressor 12 of turbomachine 10, and exhaust 2 of turbine 14/turbomachine 10. Purging fluid 101 can be introduced into purge box 100 via purge inlet 116 to alter a temperature and/or pressure of fluid in purge box 100 and/or drain trough 52, thereby reducing leakage from expansion joint 50, such as through purge box flow path 111, in conjunction with the at least one seal 118. In addition, according to embodiments provided herein, a temperature of purging fluid 101 preferably can be no more than 40° C., and a pressure of the purging fluid can be at least 110,000 Pascals (Pa) (equivalent to 1.1 Bar).

Selecting a source of purging fluid 101 to induce a pressure in purge box 100 that is higher than an operation pressure in drain trough 52 can substantially arrest leakage from expansion joint 50. In other words, employing a higher pressure purging fluid 101 can create a pressure in purge box 100 higher than a pressure at drain trough 52, which can result in a positive pressure purge, and leakage of exhaust gas 3 can be arrested. In embodiments, it is advantageous to have the pressure in purge box 100 be at least 20 Pa higher than the pressure at drain trough 52. Positive purge can also be achieved in embodiments by using a tighter or smaller gap 109 and/or by using higher source pressure for purging fluid 101 as may be suitable and/or desired. Such a positive purge can result in reduced losses in efficiency of turbomachine 10, particularly in combined cycle operation, as well as improved safety to anyone in proximity to gap 109 since a temperature of leakage flow can be reduced to about 65° C. (+/−10° C.) instead of about 315° C.

In other embodiments, a partial purge can be achieved, such as by using a pressure in purge box 100 equal to or slightly less than the pressure in drain trough 52. For example, a partial purge can be achieved using a pressure in purge box 100 that is about 20 Pa higher than the pressure in drain trough 52. However, such embodiments are less advantageous since exit temperature of purge fluid 111 can be about 243° C. Thus, embodiments achieving only a partial purge result in comparatively lower improvement in efficiency, as well as somewhat increased risk to personnel in the vicinity of the exiting purge fluid 111.

It should be understood that also disclosed herein according to embodiments is a method performed in a turbomachine including an exhaust diffuser, an aft diffuser, and an expansion joint with a drain trough disposed between the exhaust diffuser and the aft diffuser. The method can include providing a cover plate, a T-fairing with an inner fairing, a leg, a cover projection, a purge box flow path, a rear cover/flex seal, at least one seal, and a purge inlet as described above.

A technical effect of including embodiments as disclosed herein in a turbomachine is to improve operational efficiency thereof while improving safety, reducing leakage therefrom, and thereby reducing operational costs and risks associated with the turbomachine. Such a technical effect can be achieved by imposing a positive pressure purge according to embodiments as disclosed herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. As used herein, "about" and "approximately" indicates +/−10% of the value, or if a range, of the values stated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

We claim:

1. A purge box for a turbomachine including an exhaust diffuser, an aft diffuser, and an expansion joint including a drain trough therebetween, the purge box including:

a cover plate attached to a housing of the turbomachine, a portion of the housing acting as a wall of the purge box;

a flex seal attached to the expansion joint, the flex seal acting as a rear cover of the purge box;

an inner fairing adjacent an inner periphery of the cover plate with a gap between the inner periphery of the cover plate and the inner fairing;

a purge box flow path defined by at least the cover plate and the inner fairing from an interior of the purge box to the gap, the gap being adjacent the exhaust diffuser;

at least one seal in the purge box flow path; and an inlet through the cover plate and in fluid communication with a source of purging fluid having a pressure selected to induce a pressure in the purge box that is higher than a pressure within the drain trough.

2. The purge box of claim 1, wherein the inner fairing is part of a T-fairing that includes a leg extending radially outward from the inner fairing adjacent the cover plate and that forms a part of the purge box flow path.

3. The purge box of claim 1, wherein a cover projection extends from a rear of the cover plate parallel to a rotational axis of the turbomachine and forms a part of the purge box flow path.

4. The purge box of claim 1, wherein the at least one seal includes a seal configured to reduce flow through the purge box flow path while accommodating movement between the exhaust diffuser and the aft diffuser in a direction parallel to a rotational axis of the turbomachine.

5. The purge box of claim 1, wherein the at least one seal includes a seal configured to reduce flow through the purge box flow path while accommodating movement between the exhaust diffuser and the aft diffuser in a radial direction of the turbomachine.

6. The purge box of claim 1, wherein the at least one seal includes a first seal engaging a wall of the purge box flow path that is parallel to a rotational axis of the turbomachine, the first seal being connected to a part of the inner fairing so that the first seal can accommodate motion between the exhaust diffuser and the aft diffuser in a direction parallel to the rotational axis of the turbomachine.

7. The purge box of claim 6, wherein the at least one seal further includes a second seal engaging a wall of the purge box flow path that extends in a radial direction of the turbomachine, the second seal being attached to a part of the inner fairing so that the second seal can accommodate motion between the exhaust diffuser and the aft diffuser in a radial direction of the turbomachine.

8. The purge box of claim 1, wherein the pressure of the purging fluid is at least 110,000 Pascals (Pa).

9. The purge box of claim 1, wherein the pressure in the purge box is at least 20 Pa higher than the pressure within the drain trough.

10. An apparatus for a turbomachine exhaust system, the exhaust system comprising an exhaust diffuser, an aft diffuser, and an expansion joint including a drain trough therebetween, the apparatus comprising:

a cover plate extending radially from a housing of the turbomachine;

a T-fairing including an inner fairing adjacent an inner periphery of the cover plate with a gap therebetween, the inner fairing extending substantially parallel to a rotational axis of the turbomachine, the T-fairing further including a leg extending radially outward from the inner fairing adjacent and rearward of the cover plate;

a rear cover connected to the inner fairing and the housing of the turbomachine;

a purge box including at least the cover plate, the T-fairing, the rear cover, and the housing of the turbomachine, the T-fairing defining with the inner fairing and the cover plate a purge box flow path from an interior of the purge box, between the cover plate and the leg, and through the gap between the inner periphery of the cover plate and the inner fairing;

at least one seal in the purge box flow path; and a purge inlet extending through the cover plate and connected to a source of purging fluid, the purging fluid at a pressure selected to induce a pressure in the purge box that is higher than an operational pressure within the drain trough.

11. The apparatus according to claim 10, further comprising a cover projection extending parallel to the rotational axis of the turbomachine from a rear of the cover plate, the cover projection being radially outward of and radially adjacent the leg of the T-fairing, the purge box flow path further including a portion between and defined by the leg and the cover projection, and wherein the at least one seal includes a first seal between the leg of the T-fairing and the cover projection.

12. As apparatus according to claim 11, wherein the first seal includes a first tadpole seal having a head between the leg of the T-fairing and the cover projection and a tail extending from the head radially inward along and connected to the leg of the T-fairing.

13. An apparatus according to claim 12, wherein the at least one seal further includes a second seal between the cover plate and the first seal.

14. An apparatus according to claim 13, wherein the second seal includes a second tadpole seal having a respective head between the cover plate, the cover projection, and the leg of the T-fairing, a respective tail of the second tadpole seal extending from the head and connected to the leg of the T-fairing.

15. As apparatus according to claim 14, wherein the tail of the second tadpole seal extends around an outer periphery of the leg of the T-fairing and radially inward along the leg of the T-fairing.

16. An apparatus according to claim 13, wherein the second seal includes a rope seal on the cover projection and the at least one seal further includes a W seal engaging the rope seal and connected to the leg of the T-fairing.

17. An apparatus according to claim 10, wherein the at least one seal includes a forward seal between an inner periphery of the cover plate and the inner fairing, the forward seal being positioned to at least partially block the gap.

18. An apparatus according to claim 17, wherein the forward seal is a tadpole seal with a head engaging the inner fairing and a tail connected to the cover plate.

19. As apparatus according to claim 10, wherein a temperature of the purging fluid is no more than 40° C.

20. As apparatus according to claim 10, wherein a pressure in the purge box is at least 20 Pa higher than the pressure within the drain trough.

* * * * *